Nov. 3, 1931.  F. WAGNER ET AL  1,830,413
MEASURING APPARATUS
Original Filed June 6, 1928   3 Sheets-Sheet 1

Inventors
Frederick Wagner and
Howard C. Mitchell
Cornelius A. Ebet
By their Attorney Nov. 3, 1931. F. WAGNER ET AL 1,830,413
MEASURING APPARATUS
Original Filed June 6, 1928 3 Sheets-Sheet 2

Inventors
Frederick Wagner and
Howard C. Mitchell
Cornelius L. Ehret
By their Attorney Nov. 3, 1931.   F. WAGNER ET AL   1,830,413
MEASURING APPARATUS
Original Filed June 6, 1928   3 Sheets-Sheet 3

Inventors
Frederick Wagner and
Howard C. Mitchell
By Cornelius D. Ehret
their Attorney Patented Nov. 3, 1931

1,830,413

UNITED STATES PATENT OFFICE

FREDERICK WAGNER, OF ATCO, NEW JERSEY, AND HOWARD C. MITCHELL, OF PHILADELPHIA, PENNSYLVANIA, ASSIGNORS TO COCHRANE CORPORATION, OF PHILADELPHIA, PENNSYLVANIA, A CORPORATION OF PENNSYLVANIA

MEASURING APPARATUS

Original application filed June 6, 1928, Serial No. 283,243. Divided and this application filed June 8, 1929. Serial No. 369,480.

Our invention relates to measuring apparatus, including indicating, recoiding and integrating devices, and more particularly to apparatus for indicating or recording the rate of flow of a fluid or for integrating the flow of a fluid or for effecting two or more such functions simultaneously.

In accordance with our invention there intervenes between an element, whose movements and positions are representative of changes in and of the magnitudes of the quantity or condition to be measured, and the measuring device or apparatus, a compensating or rectifying cam, supporting independently of the element and biased into engagement therewith; more particularly, the independent compensating or rectifying cam is pivoted, and more particularly or preferably adjacent its upper end, for movement in either direction; and more particularly, the bias of the cam is effected solely by gravity; and more particularly, the element co-acting with the cam is moved in one direction, in response to a change in the magnitude or quantity of the condition to be measured, in opposition to the force of gravity and in opposite direction by the force of gravity; and more particularly, when said element is moved in opposition to the force of gravity in response to a change in the magnitude of the quantity or condition to be measured, it moves in such direction that it would separate from the co-acting cam surface except for the fact that the cam under its bias follows it.

Our invention further resides in features of construction, arrangement and combination hereinafter described and claimed.

For an illustration of one of the forms our invention may take, reference is to be had to the accompanying drawings in which.

Figure 4:
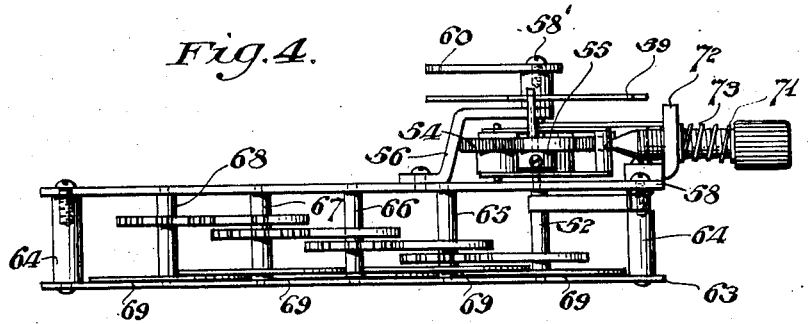
Fig. 4 is a top plan view of the mechanism of Fig. 3.
Figure 5:
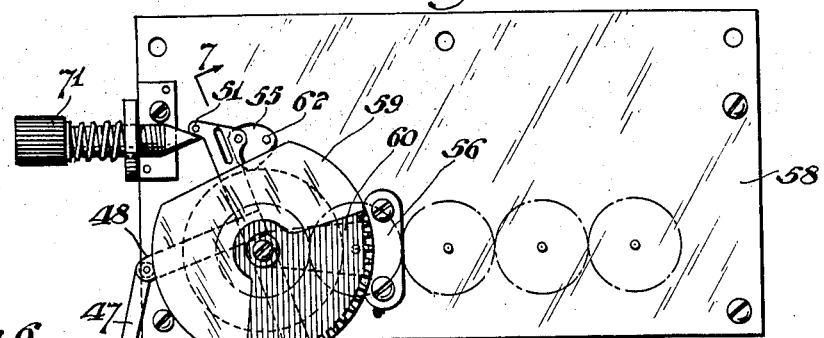
Fig. 5 is a rear elevational view of the structure of Fig. 3.
Figures 6, 7:
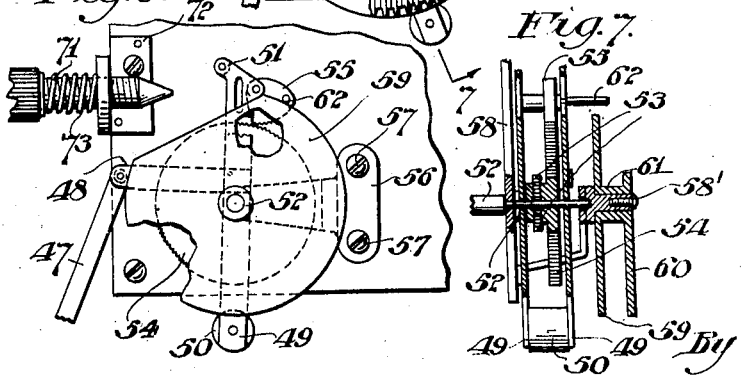

Figs. 6 and 7 are fragmentary detail views of clutch mechanism shown in Figs. 4 and 5, Fig. 7 being a section taken on line 7—7 in Fig. 5.

Figure 8:
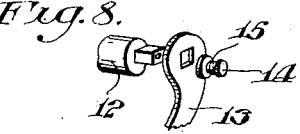

Fig. 8 is a detail perspective view illustrating a feature of construction.

Figure 9:
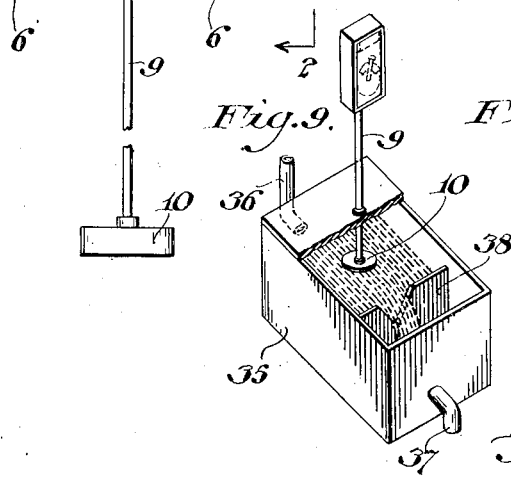

Fig. 9 diagrammatically illustrates one of the uses of our invention.

Figure 1:
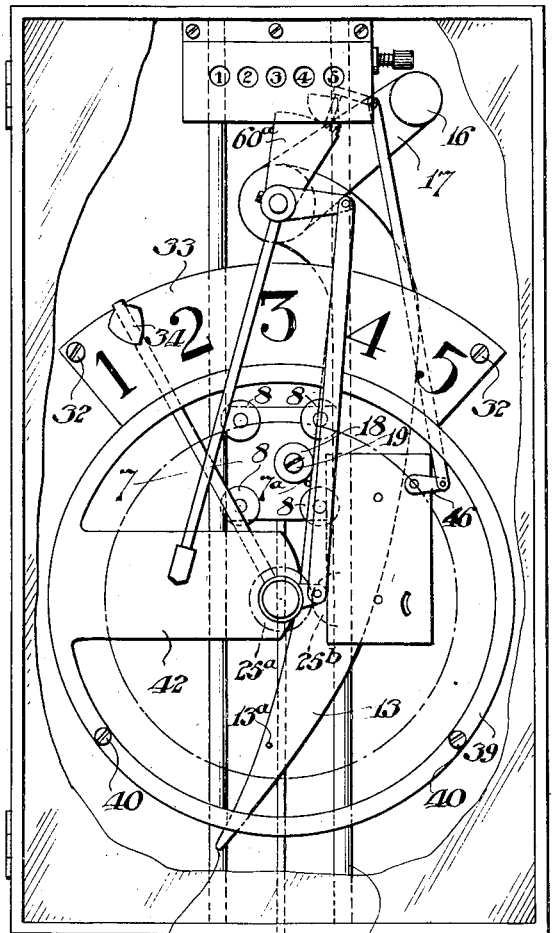
Fig. 1 is a front elevational view of an apparatus embodying our invention.
Figure 10:
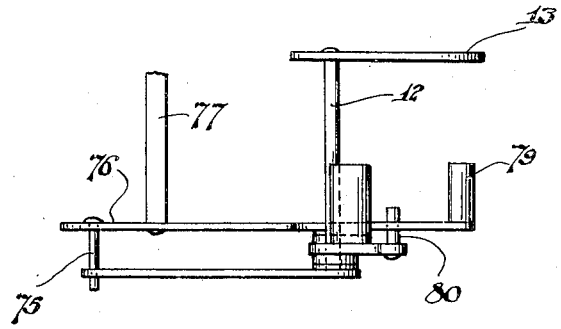
Figure 11:
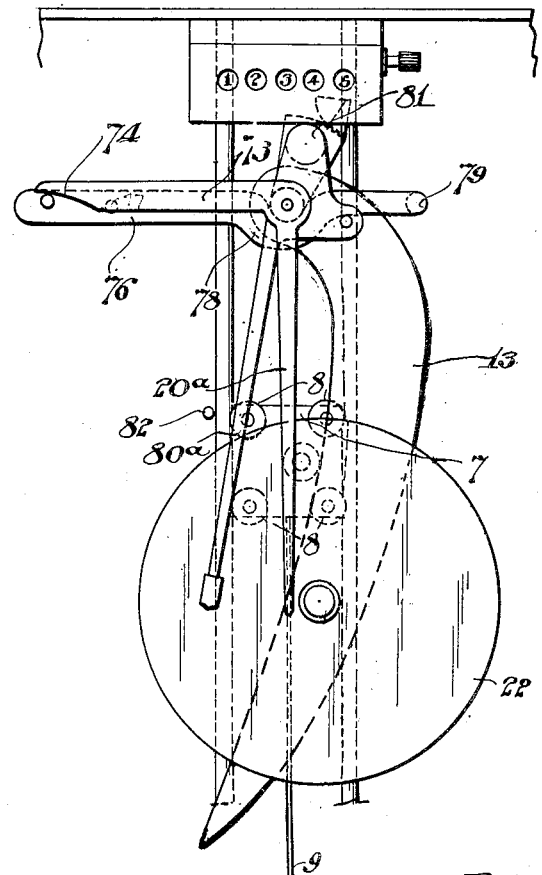

Figs. 10 and 11 are plan and front elevational views, respectively, of modified structure of Fig. 1.

Figure 2:
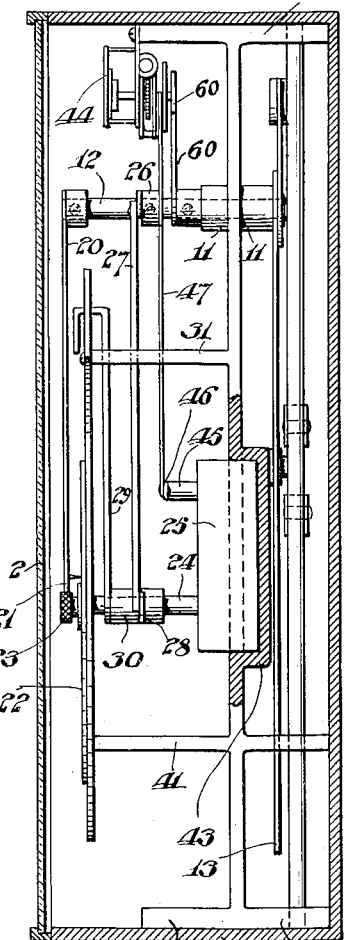
Fig. 2 is a side elevational view with parts in section of the apparatus of Fig. 1.

Referring to Figs. 1 and 2, within a housing 1, having a wall 2, the whole or at least a part of which is of transparent material as glass and displaceable when necessary or desirable for purposes hereinafter described, is disposed a casting 3 having top and base members 4 and 5, respectively, which receive the upper and lower extremities of spaced rods or bars 6 between which reciprocates a carriage member 7 having grooved rollers 8 which engage the rods in the manner illustrated. Adjustably secured to the carriage member 7 and depending therefrom is a rod 9 to the lower end of which is suitably attached a float member 10.

Near its upper end, the casting 3 is provided with a bearing 11 extending on opposite sides thereof and which receives a shaft 12 having an end adjacent and substantially equidistant from the rods 6, to which is secured a compensating cam 13.

Preferably the cam 13 is punched from a metal sheet, the aperture 13a and the hole for shaft 12 being utilized to determine the position of unpunched plate with respect to the punching dies, and therefore the zero point of the cam face contour with respect to aperture 13a.

Referring to Fig. 8 the end of the shaft 12 terminates in a portion which is non-circular or square as shown, which portion passes through an aperture of similar shape in the upper end of cam 13, the cam being retained on the shaft by a screw 14 threadably engaging the squared end of the shaft and clamping the cam between the shaft and the head of the screw 14 or a washer 15. The cam is constantly biased to rotate in a clockwise direction as viewed in Fig. 1 by any suitable mechanism, for example and preferably, by a weight 16 affixed to the end of an arm 17 attached to the shaft 12, as by being clamped between the screw 14 and the cam 13, which movement of cam 13 however is limited by a stop or abutment 18, preferably a roller freely rotatable on a screw 19, carried by the carriage member 7 and reciprocable therewith to determine the position of cam 13 and mechanism associated therewith and hereinafter described.

To the opposite end of the shaft 12 is secured the arm 20 the lower end of which is provided with a suitable marking means as a stylus or pen 21 which indicates the instantaneous position of cam 13 and which is also adapted to trace on a recorder sheet 22 clamped by thumb nut 23 to a shaft 24 driven by a clock 25 through gears 25a and 25b attached respectively to shaft 24 and a clock-driven shaft, not shown, a continuous record of the positions that the cam 13 assumes during rotation of the disk 22.

The crank arm 26 secured to shaft 12 intermediate its ends transmits movement of the cam 13 through a connecting link 27 and crank arm 28 to an indicating member or pointer 29 secured to a sleeve 30 freely rotatable on shaft 24 and integral with or suitably secured to crank arm 28.

To the outer ends of posts or standards 31 projecting forwardly from and preferably integral with casing 3, is secured, as by screws 32, an indicating plate 33. Near its free end the pointer 29 is bent forwardly and downwardly to provide a tip portion 34 disposed in front of and cooperating with the scale member 33 continuously to indicate the instantaneous variable position of cam 13.

The mechanism thus far described may be used, for example, to indicate or record, or simultaneously indicate and record, the flow of a liquid, as water, through a tank 35 (Fig. 9) having intermediate the input pipe 36 and the output pipe 37 notched weir plate 38. As is well understood in the art, the liquid level at the inlet end of the tank is a function of the rate of flow of the liquid over the notched weir plate. To indicate or record variation in the liquid level on a substantially linear scale, there is interposed between the float 10 and the indicator 34, the cam 13, the contour of whose face in engagement with the stop or abutment 18 is designed and cut to give equal increments of movement of the pen arm 20 for equal increments of change in the rate of flow of liquid through the tank 35. Upon increase in height of the liquid in the tank 35 the float 10 raises the carriage 7 and with it the abutment 18, the cam 13 rotating clockwise under the influence of the weight 16 constantly to bear against the abutment during movement of the carriage, the angular displacement of the cam and of the recording arm 20 varying in extent for equal increments of movement of the carriage 7 in accordance to the curvature or contour of the cam. The change in position of the float and hence of the rate of flow of liquid is recorded upon the circular recorder sheet 22, revolving, for example, one revolution per day, by the stylus 21 or equivalent of the recorder arm 20, the tip 34 of the indicating arm 29 indicating for any given instant the present rate of flow.

It is characteristic of the construction described that shocks imparted to the actuating rod as by violent and sudden changes of fluid flow are not transmitted to the relatively sensitive mechanism of the apparatus. As there is no fixed or rigid connection between the carriage abutment 18 and cam 13, rapid upward movement of the carriage tends to move the abutment out of contact with cam 13, lessening the contact pressure between them which cannot exceed that due to the biasing weight 16 in clockwise rotation of cam 13. Downward movement of the carriage 7 is effected substantially solely under the influence of a constant biasing force, in the described construction, that of gravity, which being relatively small, and active only through a comparatively short distance, is incapable of delivering an appreciable shock to the cam. Furthermore the suspended cam 13 and its counterweight or an equivalent construction constitute a buffer arrangement which tends to reduce shock during counterclockwise rotation of the cam.

Integral with or suitably secured to the indicator plate 33 is a ring 39 through which pass the screws 40 into the ends of standards 41 projecting forwardly from and preferably integral with the casting 3. A member 42 inwardly extending from and preferably integral with the ring 39 supports the back of the recorder disk 22 in the path of movement of the recording pen to prevent deformation of a sheet by the pen and to insure that legible record results.

Upon displacement of the wall 2 of housing 1, and after removal of actuating rod 9, the entire assembly may be removed as a unit for inspection, repair or replacement of parts. For example, the device may be utilized with an apparatus other than a V notch weir in which event, compensating cam 13 as described is removed and replaced by one having a proper contour compensating for a different law of operation of the apparatus.

In installing the device, for example, in a system as above described, a suitable tool or pin is inserted through the aperture 13a in the cam 13 and relative movement of cam 13 and carriage 7 effected until the pin engages a recess or hole 7a in carriage 7, in which position the roller 18 engages the cam face at its zero point. The pointer 29 and recorder arm 20 should then be disposed opposite the zero mark of their respective scales and the actuating rod 9 adjusted to its proper position.

The clockwork mechanism 25 disposed and secured within a recessed portion 43 of the casting is also utilized to actuate an integrating mechanism 44 which directly indicates the total flow of liquid, as water. To the end of shaft 45 of the clockwork train is secured a crank arm 46 connected through link 47 to the arm 48 of a framework comprising two spaced members 49 connected at their lower ends by a spacer 50, preferably weighted, and at their upper ends by a cross-bar 51, and pivoted intermediate their ends and freely rotatable on a shaft 52, to which is secured as by set screws 53 a disk 54 having a serrated edge or periphery adapted to be engaged by the correspondingly serrated portion of a weighted pawl member 55 pivoted between frame members 49 at or near their upper ends. The outer end of shaft 52 is journaled in the free end of a bracket member 56 secured as by screws 57 to the base plate 58 of indicating mechanism 44. Suitably attached to the bracket 56 and concentric with shaft 52 is a bearing 58 on which is rotatably mounted a unit comprising the cam 59, gear segment 60 and a sleeve 61 connecting them. The gear segment 60 is in meshing engagement with a gear segment 60a secured to and rotatable about shaft 12 as an axis, the position of the high part of the cam 59 therefore being determined by the position of the compensating cam 13, and indirectly to the position of float 10. By using a single horologic mechanism 25, there is obtained exact synchronism between rotation of the recorder disk and of the oscillations of the cam-supporting framework. The edge of the cam 59 is in the path of and adapted to engage a pin 62 extending from the pawl member 55 to effect disengagement of the pawl from the ratchet disk 54. Upon relative movement of the pawl and cam to a position in which the pin 62 is not in engagement with the periphery of the cam, the pawl by its weight drops into engagement with the ratchet disk or wheel 54. Secured to the shaft 52 between the base or main plate 58 and a front plate 63 spaced therefrom as by columns or standards 64 is the first gear of a Geneva train comprising the shafts 65, 66, 67 and 68, having their opposite ends journaled in the plates 58 and 63 and on which are mounted Geneva gears and indicating dials in the usual manner. As is customary, the front plate 63 is provided with a series of apertures through which the numerals on the respective indicating dials 69 appear in succession.

Figure 3:
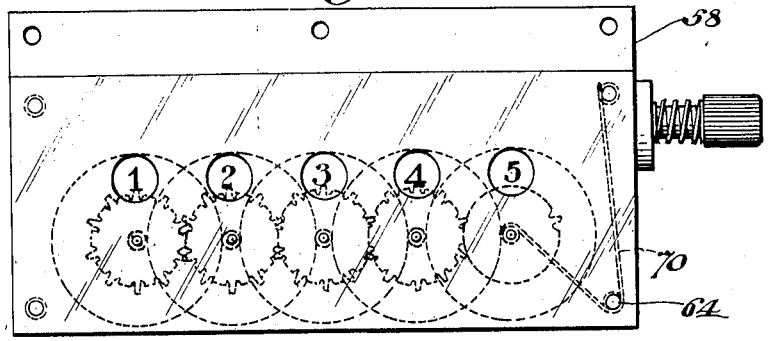
Fig. 3 is a front elevational view, on an enlarged scale, of integrating mechanism shown in Fig. 1.

A flat spring 70 of suitable metal as phosphor bronze is bent over one of the standards 64 and the free ends of the spring engage respectively a second post 64 and the shaft 52. The two posts 64 with which the spring 70 is in contact may be suitably recessed to prevent lateral displacement of the spring. The spring may be withdrawn when desired by moving the free ends towards each other and moving the spring downwardly and to the right as viewed in Fig. 3.

The shaft 45 is rotated at a constant speed by the clockwork mechanism 25 and the pawl 55 through crank arm 46, connecting rod 47, and frame members 49 are oscillated through an angle of fixed or predetermined magnitude at a constant frequency, as for example, one reciprocation per minute. The load imposed upon the clockwork driving mechanism is, therefore, practically constant.

The angle may be nicely adjusted by rotation of screw 71 supported by a bracket 72 secured to plate 58, and having a tapered end adapted to engage cross bar 51 of the oscillating framework carrying pawl 55 at one end of its range of movement. A stiff helical spring coiled about the screw between bracket 72 and the knurled head of the screw holds it firmly in adjusted position. After engagement of the bar 51 and the end of the screw 71, upon continued rotation of crank arm 46, the connecting link 47 which is slightly bowed, straightens to an extent permitting crank arm 46 to continue to revolve.

In the installing of the apparatus or thereafter when it is desired to check the accuracy of the integrating mechanism, the carriage 7 is moved to its lowest position and the arm 48 oscillated several times. No change of reading of the indicating dials should result. The carriage is then moved to a second position, as to its most upward one, and the arm 48 oscillated a predetermined number of times, if the engagement between the clutch members is of proper duration, a known change of reading is effected. If the change is other than the correct one, screw 71 is adjusted in one direction or the other until the proper change in indication, for a definite number of oscillations of arm 48, and a certain position of cam 13, is produced.

The duration of contact between the pawl 55 and the ratchet disc 54 connected to the indicating mechanism is determined by the position of the high part of cam 59 which as above stated bears a definite relation to the position of the compensating cam 13 and therefore to the instantaneous rate of flow over the notched weir plate 38.

In the modified construction shown in Figs. 10 and 11, a member 73 rotatable with the cam-actuated shaft 12 and preferably as indicated, an integral part of recorder arm 20a, is provided with a cam portion 74 with which engages an abutment 75 projecting from the lever 76 pivotally mounted on a stationary standard 77, similar to standards 31, and extending towards and beyond shaft 12, the curved portion 78 thereof being provided to prevent restriction of its movement by the shaft. The weight 79 suitably secured to lever 76 biases it for rotation about its pivot in a clockwise direction as viewed in Fig. 11, which movement takes place when cam 13 rotates in the same direction about its axis. Reverse movement of the cam effects counter-clockwise rotation of the lever 76 through pin 75 and cam 74 in opposition to the biasing effect of weight 79.

Near its outer end, the lower surface of the lever bears upon a pin 80, or equivalent, secured to and projecting from a second recorder arm 80a or equivalent freely rotatable on shaft 12 and substantially unbalanced by counterweight 81. Small movement of cam 13 in a clockwise direction is transmitted as above described to the multiplying lever system and the amplified movement of lever 76 is transmitted through pin 80 to the recorder arm 80a to trace an easily readable record on the chart 22. Reverse movement of the cam forces arm 76 to rotate in a counter-clockwise direction permitting arm 80a to move towards the center of the chart. When the instrument is operating within a range in which the arm 20a traces a satisfactory record, the arm 80a is held in its extreme outer position against stop 82 by lever 76, the arm 73 having been moved to such an extent that cam 74 thereof is out of engagement with pin 75. The cam face 74 is of such contour that it compensates for change in the effective length of lever arm 73 so that irrespective of the position of cam 13, the ratio between its movement and that of arm 80a is fixed or substantially constant.

It will be understood that our invention is not limited to measurement of flow of liquid over a V notch weir but may be utilized in any system of measurement in which the increments of movement of a member actuated by or movable in response to change in magnitude of a condition are not equal for equal increments of change in magnitude of the condition.

This application is a division of our co-pending application Serial #283,243, filed June 6, 1928.

What we claim is:

1. Apparatus of the character described comprising structure rotatable in response to change in magnitude of a condition, a recorder arm rotatable co-axially therewith, and a multiplying lever system connecting said structure and said arm.

2. Apparatus of the character described comprising structure rotatable in response to change in magnitude of a condition, a pivoted lever biased into engagement therewith, and an arm biased into engagement with said lever and moved thereby to extents greater than extents of movement of said structure.

3. Apparatus of the character described comprising structure rotatable in response to change in magnitude of a condition, a recorder arm directly actuated thereby, a second recorder arm, a multiplying linkage system between said second arm and said structure, and means to disconnect said second arm from said structure when said first arm is actuated in response to change in magnitude in a range above a predetermined magnitude.

4. Apparatus of the character described comprising a member reciprocable in response to change in magnitude of a condition to equal extents of movement for unequal increments of change in magnitude of the condition, a second member, and pivoted cam structure engaged by said first member and associated with said second member to effect equal extents of movement of said second member for equal increments of change in magnitude of said condition.

5. Apparatus of the character described comprising a member reciprocable in response to change in magnitude of a condition to equal extents of movement for unequal increments of change in magnitude of the condition, a second member, pivoted cam structure engaged by said first member and associated with said second member to effect equal extents of movement of said second member for equal increments of change in magnitude of said condition, and means continuously to bias said cam structure to engagement with said first member.

6. Apparatus of the character described comprising vertically reciprocable abutment structure, pivotally suspended cam structure engaged thereby, and a member associated with and movable by said cam structure to extents representative of the changes of magnitude of a condition effecting reciprocation of said abutment structure.

7. Measuring apparatus of the character described comprising abutment structure vertically reciprocable in response to change in magnitude of a condition being measured, suspended cam structure in the path of said abutment moved thereby during downward movement thereof, and means to effect movement of said cam structure during upward movement of said abutment structure.

8. Measuring apparatus of the character described comprising abutment structure reciprocable in response to change in magnitude of a condition being measured, a shaft, a cam thereon disposed in the path of said abutment structure, and biasing means associated therewith to maintain engagement of said cam and said abutment structure.

9. Measuring apparatus of the character described comprising abutment structure vertically reciprocable in response to change in magnitude of a condition being measured, a shaft, cam structure thereon and depending therefrom into the path of said abutment structure, and a weighted arm secured to said shaft to maintain engagement of said cam and abutment structures.

10. Flow-measuring apparatus comprising a member movable to unequal extents for equal changes in rate of flow, vertically reciprocable abutment structure actuated thereby, a pivotally suspended cam biased into engagement with said structure, and a member moved by said cam to equal extents for equal changes in rate of flow.

11. In measuring apparatus, an element supported for movement in a fixed path, means for adjusting the position of said element along said path in accordance with variations in a condition to be measured, a cam having a compensating surface engaging said element and supported for free movement in opposite directions, and biasing means for maintaining engagement of said surface with said element.

12. In measuring apparatus, an element supported for movement in a fixed path, means for adjusting the position of said element along said path in accordance with variations in a condition to be measured, a cam having a compensating surface engaging said element and supported for free movement in opposite directions, and biasing means for maintaining engagement of said surface with said element, said element moving away from said surface in response to change in one sense in said condition.

13. In measuring apparatus, an element supported for vertical movement in a fixed path, means for adjusting the position of said element along said path in accordance with variations in a condition to be measured, a cam having a compensating surface engaging said element and supported for free movement in opposite directions, and biasing means for maintaining engagement of said surface with said element, said element and said cam disposed in such relation with respect to each other that upward movement of said element is in a direction away from the cam surface.

14. In measuring apparatus, an element supported for free upward and downward movement, the downward movement induced solely by the force of gravity, means associated with said element for imparting upward movement thereto incident to and in amount representing increase in a condition to be measured, a cam having a compensating surface engaging said element and supported for free movement in opposite directions and biased solely by the force of gravity to maintain engagement of said surface with said element, said element and said cam disposed in such relation with respect to each other that upward movement of said element is in a direction away from the cam surface to permit free movement of the cam in one direction solely by the biasing force of gravity and downward movement of said element causes the same to engage the cam surface and induce movement of the cam in the opposite direction solely by the force of gravity acting on said element.

FREDERICK WAGNER.
HOWARD C. MITCHELL.